US010029334B2

(12) United States Patent
Kim et al.

(10) Patent No.: US 10,029,334 B2
(45) Date of Patent: Jul. 24, 2018

(54) APPARATUS AND METHOD FOR MONITORING LASER WELDING BEAD

(71) Applicant: Electronics and Telecommunications Research Institute, Daejeon (KR)

(72) Inventors: Keo-Sik Kim, Gwangju (KR); Hyun Seo Kang, Gwangju (KR); Young Soon Heo, Gwangju (KR); Hyoungjun Park, Gwangju (KR); Kwon-Seob Lim, Gwangju (KR); Jeong Eun Kim, Gwangju (KR); Eun Kyoung Jeon, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 648 days.

(21) Appl. No.: 14/317,630

(22) Filed: Jun. 27, 2014

(65) Prior Publication Data
US 2015/0001196 A1 Jan. 1, 2015

(30) Foreign Application Priority Data
Jul. 1, 2013 (KR) .......................... 10-2013-0076693

(51) Int. Cl.
*B23K 26/02* (2014.01)
*B23K 31/12* (2006.01)
(Continued)

(52) U.S. Cl.
CPC .......... *B23K 31/125* (2013.01); *B23K 26/032* (2013.01); *B23K 26/26* (2013.01); *B23K 2201/18* (2013.01)

(58) Field of Classification Search
CPC ............................. B23K 26/032; B23K 26/04
(Continued)

(56) References Cited

U.S. PATENT DOCUMENTS

| 5,493,632 A * | 2/1996 | Ahn ........................ G06N 3/063 |
| | | 706/28 |
| 6,028,671 A | 2/2000 | Svetkoff et al. |

(Continued)

FOREIGN PATENT DOCUMENTS

| JP | H07-100646 A | 4/1995 |
| KR | 10-1026720 B1 | 4/2011 |

(Continued)

OTHER PUBLICATIONS

Shawn Lawson er al. "Automatic detection of defects in industrial ultrasound images using a neural network" Mechatronic Systems and Robotics Research Group Department of Mechanical Engineering University of Surrey, 1996.*

(Continued)

*Primary Examiner* — Tu B Hoang
*Assistant Examiner* — Joseph Baillargeon
(74) *Attorney, Agent, or Firm* — Rabin & Berdo, P.C.

(57) ABSTRACT

An apparatus for monitoring a laser welding bead irradiates a laser to a surface of a welding bead when welding with a laser welding machine, collects a signal reflected from the surface of the welding bead as an image signal, and then extracts at least one feature variable of a bead shape using the collected image signal. Then, the apparatus for monitoring the laser welding bead determines welding defects using the at least one feature variable, and controls an operation of the laser welding machine according to whether or not the welding defects are generated.

13 Claims, 9 Drawing Sheets

WELDING PERFORMING DIRECTION

(51) Int. Cl.
*B23K 26/03* (2006.01)
*B23K 26/26* (2014.01)
*B23K 101/18* (2006.01)

(58) Field of Classification Search
USPC .............. 219/121.64, 121.83, 121.63, 121.6, 219/130.01, 110, 124.34; 700/166, 212, 700/30, 47, 48; 382/152, 286, 155–159, 382/170; 706/23
See application file for complete search history.

(56) References Cited

U.S. PATENT DOCUMENTS

| | | | |
|---|---|---|---|
| 6,031,200 A * | 2/2000 | Whitehouse | G01B 11/02 219/121.67 |
| 7,412,890 B1 | 8/2008 | Johnson et al. | |
| 7,557,326 B2 | 7/2009 | Boillot et al. | |
| 8,256,296 B2 | 9/2012 | Ume et al. | |
| 8,262,427 B2 * | 9/2012 | Oka | B23K 26/032 438/4 |
| 8,653,407 B2 | 2/2014 | Oh | |
| 2006/0120575 A1 | 6/2006 | Ahn et al. | |
| 2010/0326962 A1 * | 12/2010 | Calla | B23K 9/0956 219/76.14 |
| 2011/0023610 A1 * | 2/2011 | Ume | G01N 29/11 73/622 |
| 2012/0152916 A1 | 6/2012 | Oowaki et al. | |
| 2014/0131333 A1 * | 5/2014 | Zhang | B23K 9/0956 219/130.31 |

FOREIGN PATENT DOCUMENTS

| | | |
|---|---|---|
| KR | 10-2012-0053558 A | 5/2012 |
| KR | 10-1230221 B1 | 2/2013 |
| KR | 10-1236847 B1 | 2/2013 |
| KR | 10-2013-0038001 A | 4/2013 |
| WO | WO-2001/039919 A2 | 6/2001 |

OTHER PUBLICATIONS

Soo Nam Kwak et al., "Pipe Line Defect Detection Using Neural Network and Image Processing", Korean Society of Civil Engineers Convention, pp. 3785-3788, 2006, Englsih abstract.

* cited by examiner

APPARATUS AND METHOD FOR MONITORING LASER WELDING BEAD

CROSS-REFERENCE TO RELATED APPLICATION

This application claims priority to and the benefit of Korean Patent Application No. 10-2013-0076693 filed in the Korean Intellectual Property Office on Jul. 1, 2013, the entire contents of which are incorporated herein by reference.

BACKGROUND OF THE INVENTION (a) Field of the Invention

The present invention relates to a method and an apparatus for monitoring a laser welding bead, and more particularly, to a technology capable of determining in real time whether or not welding defects are generated during laser welding.

(b) Description of the Related Art

Because laser welding has excellent welding quality, has a fast processing speed, and is applicable to a heterojunction of various materials, it has been used in various industry fields.

Because quality monitoring of a laser welding bead by an existing tailor welded blanks (TWB) process is generally performed by a visual quality inspection by a worker, a material rupture caused by missed detection of a pinhole in a post-process has frequently occurred. Therefore, in order to solve the problem described above and improve welding quality, an apparatus capable of automatically determining a welding quality state by observing a welding bead shape in real time when the welding is performed necessarily needs to be attached.

As a conventional art, various technologies for monitoring the welding state have been suggested. However, the suggested technologies have drawbacks that the monitored results are somewhat inaccurate and there is a limitation in performing real time monitoring, because signal distortion caused by background noise is severe, a filter configuration is complex, or whether or not the defects are generated is determined by a simple dimension comparison. In addition, the suggested technologies have a drawback that there is a limitation in using for an actual field or a limitation in using for various welding bead shapes.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and a method for monitoring a laser welding bead capable of easily managing a welding production process by performing welding bead quality monitoring in real time and immediately notifying a user of defects upon sensing the defects.

An exemplary embodiment of the present invention provides an apparatus for monitoring a welding bead generated by welding of a laser welding machine. The apparatus may include a vision sensor part and a terminal part. The vision sensor part may irradiate a laser to a surface of the welding bead and collect a signal reflected from the surface of the welding bead as an image signal. The terminal part may measure a bead shape from the collected image signal, extract at least one feature variable from the bead shape, determine welding defects using the at least one feature variable, and classify defective forms at the time of determining the welding defects.

When the terminal part determines normal welding, the terminal part may instruct the laser welding machine to perform welding at a next position.

When the terminal part determines the welding defects, the terminal part may instruct the laser welding machine to perform welding at a next position or stop the welding according to a selection of a user.

The vision sensor part may include a laser scan camera and a telecentric lens. The laser scan camera may include a charge-coupled device (CCD) sensor converting the signal reflected from the surface of the welding bead into an image signal. The telecentric lens may pass only a signal parallel to an optical axis among the signals reflected from the surface of the welding bead to the laser scan camera.

The vision sensor part may include a laser diode, a collimation lens, and a laser structured light lens. The laser diode may irradiate the laser. The collimation lens may remove diffuse components of the laser and provide linearity. The laser structured light lens may uniformly irradiate the laser to the surface of the welding bead.

The terminal part may respectively classify the welding defects and the defective forms using a neural network.

Another embodiment of the present invention provides a method for monitoring a welding bead generated by welding of a laser welding machine in an apparatus for monitoring a laser welding bead. The method may include: irradiating a laser to a surface of the welding bead; collecting a signal reflected from the surface of the welding bead as an image signal; measuring a bead shape from the collected image signal; extracting at least one feature variable from the bead shape; determining welding defects using the at least one feature variable; and controlling the laser welding machine according to whether or not the welding defects are generated.

When normal welding is determined, the controlling of the laser welding machine may include instructing the laser welding machine to perform welding at a next position.

The determining of the welding defects may include classifying the welding bead into welding defects or normal welding from the at least one feature variable using a neural network.

The controlling of the laser welding machine may include: when the welding defects are determined, determining defective forms of the welding bead; displaying the defective forms; and instructing the laser welding machine to perform welding at a next position or stop the welding according to a selection of a user.

The determining of the defective forms may include classifying the defective forms of the welding bead from the at least one feature variable using a neural network.

DETAILED DESCRIPTION OF THE EMBODIMENTS

Figure 1:
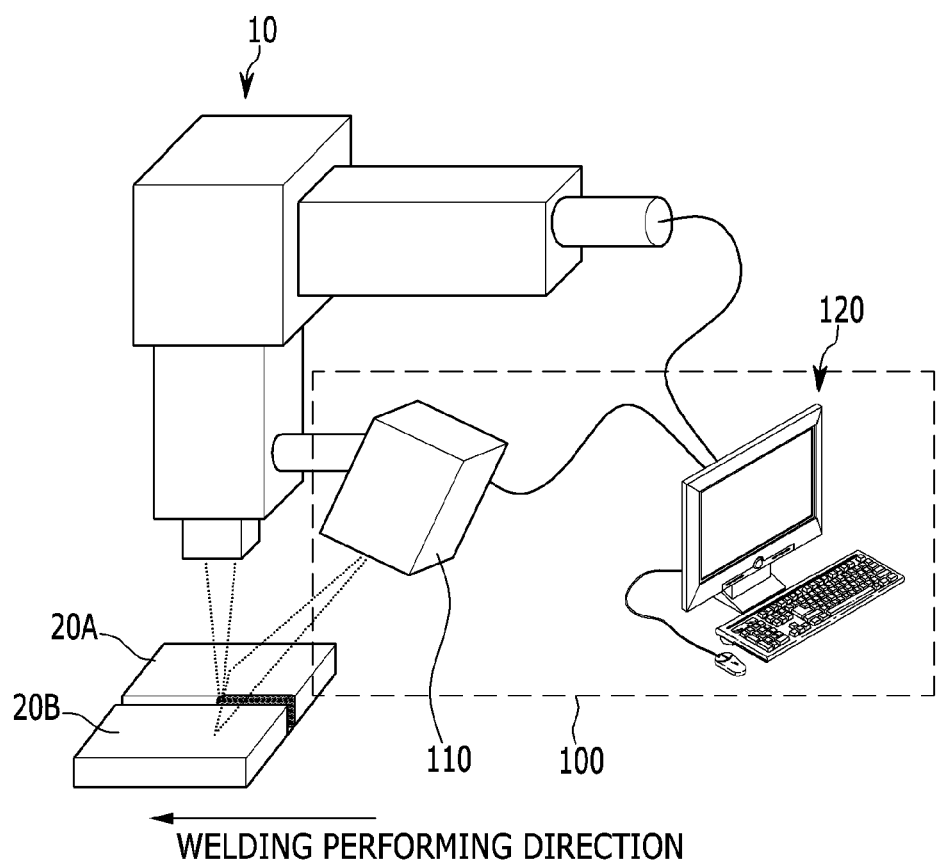
FIG. 1 is a schematic diagram of an apparatus for monitoring a laser welding bead according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Hereinafter, an apparatus and a method for monitoring a laser welding bead according to an exemplary embodiment of the present invention will be described in detail with reference to the accompanying drawings.

FIG. 1 is a schematic diagram of an apparatus for monitoring a laser welding bead according to an exemplary embodiment of the present invention.

Referring to FIG. 1, an apparatus 100 for monitoring a laser welding bead includes a vision sensor part 110 and a terminal part 120.

A laser welding machine 10 is used to weld two basic materials 20A and 20B. While the two basic material 20A and 20B are welded by the laser welding machine 10, a welding bead is generated.

The vision sensor part 110, which is attached to a side of the laser welding machine 10, irradiates a patterned laser to a surface of the welding bead, converts a signal reflected from the surface of the welding bead into an image signal, and collects the image signal. The collected image signal is transferred to the terminal part 120.

The terminal part 120 generates a bead shape image signal using the image signal collected from the vision sensor part 110 and determines whether or not welding defects are generated from the bead shape image signal. In addition, the terminal part 120 controls an operation of the laser welding machine 10 depending on whether or not the welding defects are generated.

Figure 2:
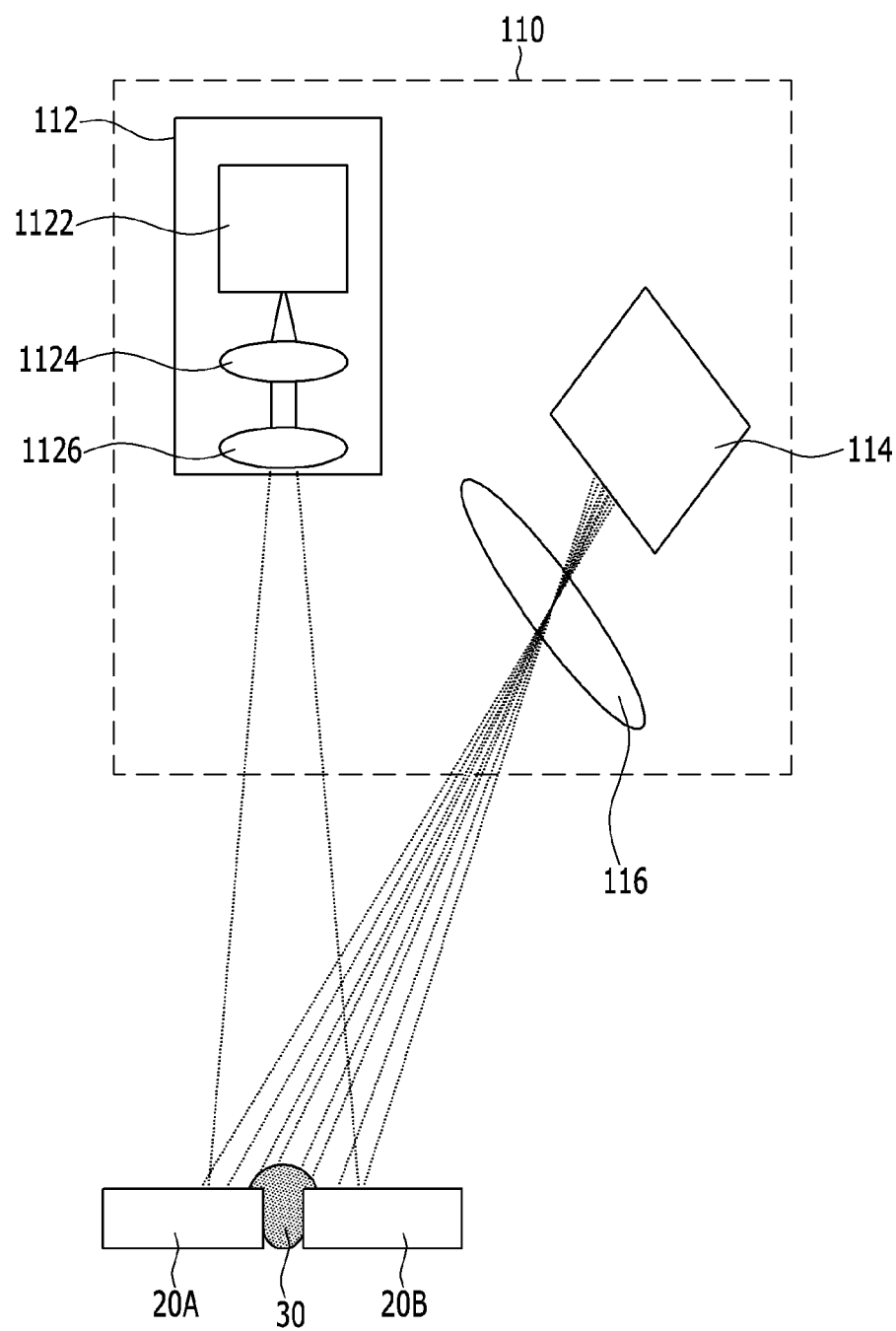
FIG. 2 is a drawing showing a vision sensor part shown in FIG. 1.

FIG. 2 is a drawing showing a vision sensor part shown in FIG. 1.

Referring to FIG. 2, the vision sensor part 110 includes a laser diode module 112 and a laser scan camera 114. In addition, the vision sensor part 110 may further include a telecentric lens 116.

The laser diode module 112 irradiates a laser having a patterned line form to the welding bead 30. The laser diode module 112 may include a laser diode 1122 irradiating a visible light region laser of a visible light region (e.g., a wavelength band of 650 nm), a collimation lens 1124 removing diffuse components of the laser and providing linearity, and a laser structured light lens 1126 for irradiating a laser of a uniformly patterned line to the surface of the welding bead 30.

The laser scan camera 114 includes a charge-coupled device (CCD) sensor for sensing the signal reflected from the surface of the welding bead 30 as the image signal. The laser scan camera 114 senses the laser signal reflected from the surface of the welding bead 30 in a line scan format at a high speed, converts the sensed laser signal into the image signal, and transfers the image signal to the terminal part 120.

The telecentric lens 116 is positioned at a front stage of the laser scan camera 114, and maintains a constant focus to the laser scan camera 114 by passing only light parallel to an optical axis among light reflected from the welding bead 30.

Although the specification describes a case in which the laser diode 1122 uses a wavelength of light in the visible light region, light sources having various sensible wavelength bands (e.g., wavelength bands from 400 nm to 1000 nm) may be used depending on kinds and performance of the laser scan camera 114.

In addition, although the specification describes a case in which the laser scan camera 114 has the CCD sensor for monitoring the welding bead in real time mounted thereon and uses the camera of the line scan format capable of collecting the signal at a high speed, various camera such as a complementary metal-oxide semiconductor (CMOS) camera and the like may be used depending on the purpose of a user.

In addition, although the specification describes a case in which the laser structured light lens 1126 irradiates the structured light having the line form for performing a two-dimensional line scan at a high speed, when many line scans (e.g., a three-dimensional line scan) are desired at one time depending on the purpose of the user, a lens capable of irradiating structured light having a surface form suitable for the purpose described above using the laser structured light lens 1126 may be used.

Figure 3:
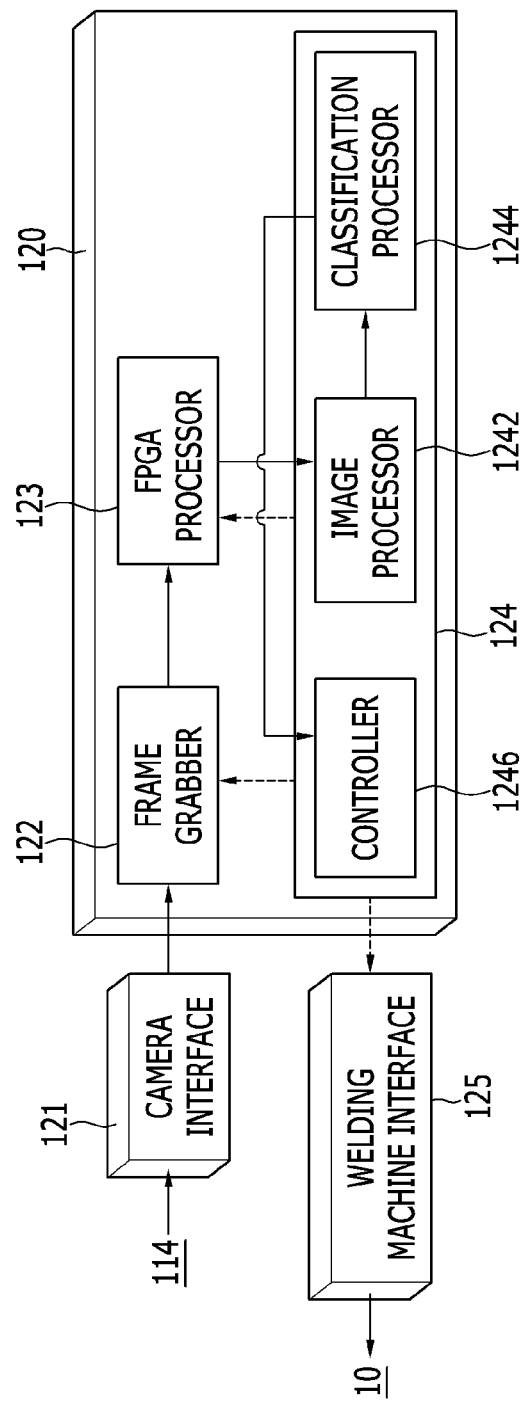
FIG. 3 is a drawing showing a terminal part shown in FIG. 1.

FIG. 3 is a drawing showing a terminal part shown in FIG. 1.

Referring to FIG. 3, the terminal part 120 includes a camera interface 121, a frame grabber 122, a field programmable gate array (FPGA) processor 123, a central processor 124, and a welding machine interface 125.

The camera interface 121 receives the image signal collected from the laser scan camera 114 and transfers the image signal to the frame grabber 122.

The frame grabber 122 transfers the image signal transferred from the camera interface 121 to the FPGA processor 123.

The FPGA processor 123 measures a bead shape using the image signal transferred from the frame grabber 122 and transfers a bead shape image signal to the central processor 124.

The central processor 124 includes an image processor 1242, a classification processor 1244, and a controller 1246.

The image processor 1242 removes noise from the bead shape image signal transferred from the FPGA processor 123 using a variety of image signal processing techniques, and then extracts the feature variables. The image processor 1242 may use a low pass filter to remove the noise from the bead shape image signal. Particularly, as the low pass filter, a secondary Savitzky-Golay filter, which is able to minimize signal distortion and does not generate signal delay after performing the filtering, may be used.

The classification processor 1244 determines whether or not welding defects are generated using the feature variable and classifies a defect form (pattern).

The controller 1246 controls the operation of the laser welding machine 10 depending on whether or not the welding defects are generated and the welding form. The controller 1246 may control the frame grabber 122 and the FPGA processor 123. In addition, the controller 1246 displays the welding defects upon sensing the welding defects to thereby inform the user of the welding defect.

The welding machine interface 125 transfers a control signal controlling the operation of the laser welding machine 10 from the controller 1246 to the laser welding machine 10. The laser welding machine 10 is operated according to the control signal.

Here, as the camera interface 121 and the welding machine interface 125, a camera link specification (base/medium/full) interface, IEEE1394, a serial port, a USB, and the like may be various used according to kinds of the used laser scan camera 114 or laser welding machine 10.

Figure 4:
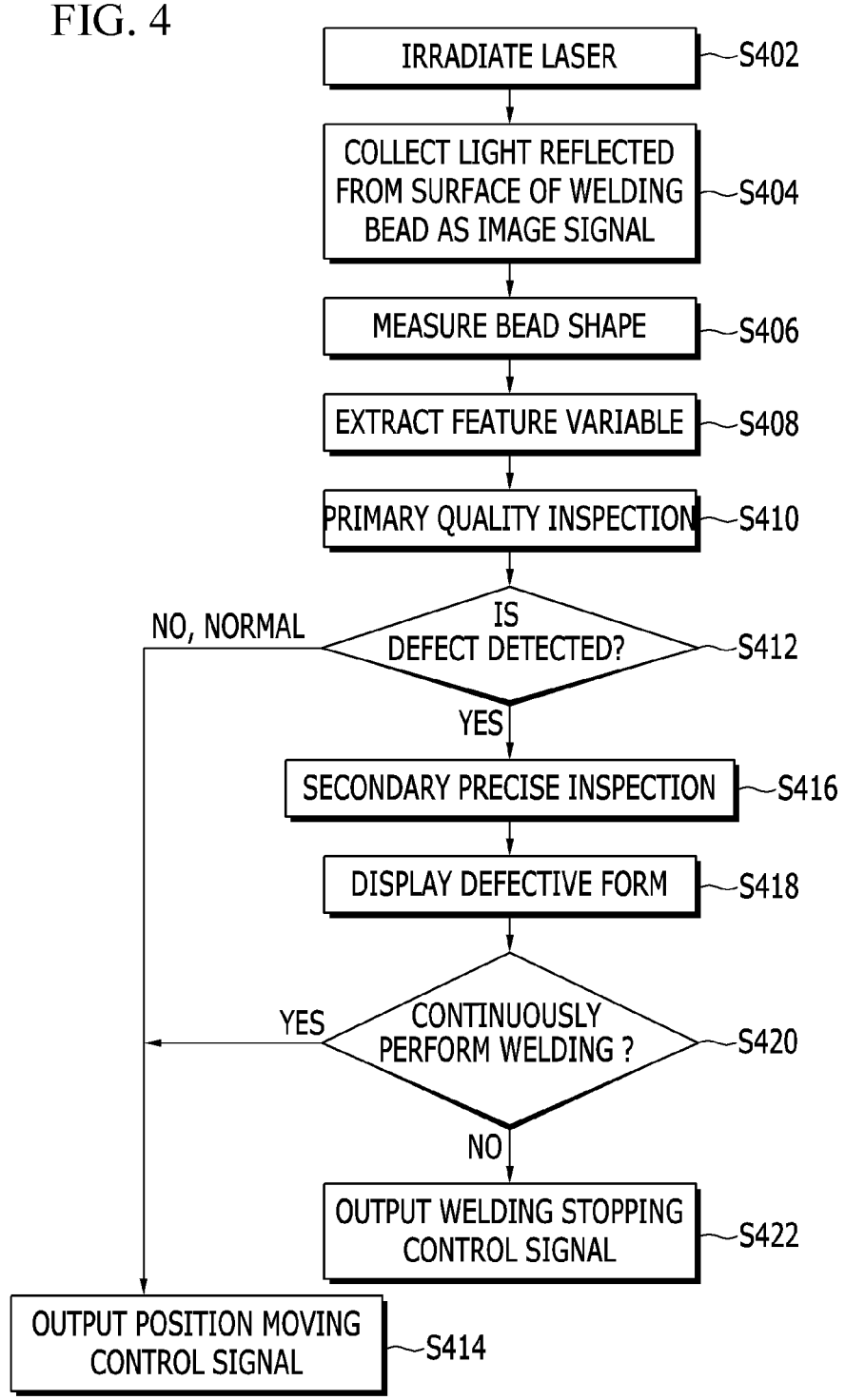
FIG. 4 is a flowchart showing a method for monitoring a laser welding bead according to an exemplary embodiment of the present invention.

FIG. 4 is a flowchart showing a method for monitoring a laser welding bead according to an exemplary embodiment of the present invention.

Referring to FIG. 4, the laser welding machine 10 initializes welding conditions and then performs laser welding.

The vision sensor part 110 irradiates the patterned laser to a portion welded simultaneously with the laser welding, that is, a surface of the welding bead (S402), and collects light reflected from the surface of the welding bead as the image signal (S404). The vision sensor part 110 transfers the collected image signal to the terminal part 120.

The terminal part 120 reconfigures the bead shape from the image signal (S406), and performs signal processing for removing the noise of the bead shape image signal and then extracts the feature variables from the signal processed image signal to classify the bead shape (S408).

The terminal part 120 performs primary quality inspection determining whether or not the welding defects are generated, using the extracted feature variables (S410).

If a result of the primary quality inspection is determined to be normal welding (S412), the terminal part 120 outputs a position moving control signal moving a position of the laser welding machine 10 to the laser welding machine 10 (S414).

Meanwhile, if the result of the primary quality inspection is determined to be defective welding (S412), the terminal part 120 performs a secondary precise inspection classifying defective forms using the extracted feature variables (S416) and displays the classified defective forms to thereby inform the user of the defect form (S418).

The terminal part 120 determines whether or not the welding is continuously performed, according to a selection of the user. If the user wants to continuously perform the welding (S420), the terminal part 120 outputs the position moving control signal to the laser welding machine 10 (S414). On the other hand, if the user wants to stop the welding (S420), the terminal part 120 outputs a welding stopping control signal to the laser welding machine 10 (S422).

The laser welding machine 10 performs a laser welding at a next position according to the position moving control signal from the terminal part 120. If the laser welding machine 10 receives the welding stopping control signal from the terminal part 120, the laser welding machine 10 terminates the laser welding.

Figure 5:
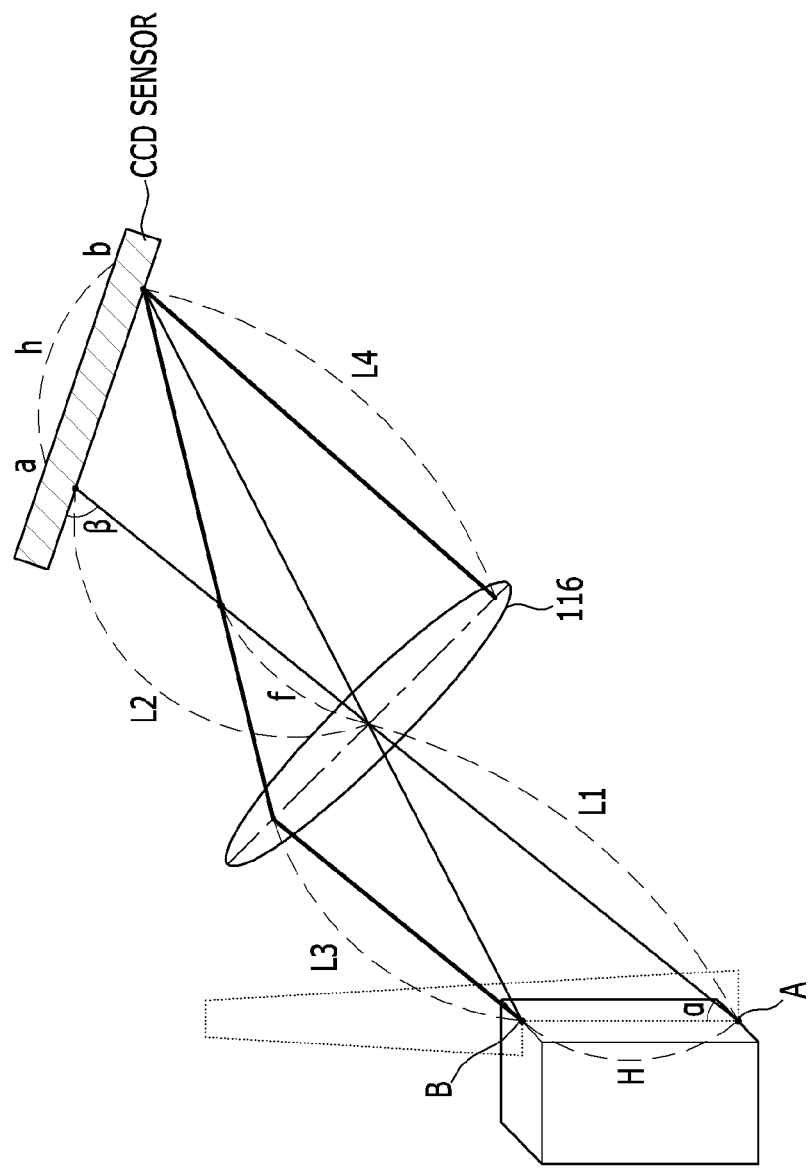
FIG. 5 is a drawing showing a method for reconfiguring a bead shape according to an exemplary embodiment of the present invention.

FIG. 5 is a drawing showing a method for reconfiguring a bead shape according to an exemplary embodiment of the present invention.

As shown in FIG. 5, the signal reflected from the surface of the welding bead is received at the CCD sensor of the laser scan camera 114.

An actual size of the bead shape may be measured by the FPGA processor 123 through the variables associated with an optical structure of the laser scan camera 114.

The bead shape may be measured using Equation 1 and Equation 2.

$$H = \frac{h\sin\beta(L_1 - f)}{f\sin\alpha - h\cos\alpha\sin\beta}$$ [Equation 1]

$$\beta = \tan^{-1}\left(\frac{L_1 - f}{f}\tan\alpha\right)$$ [Equation 2]

Referring to FIG. 5, h refers to an actual distance at which an image reflected from a point A and an image reflected from a point B are detected by the laser scan camera, $L_1$, $L_2$, $L_3$, and $L_4$ refer to distances between the telecentric lens 116 and objects, f refers to a focal length of a lens, $\alpha$ refers to an angle between the optical axis and the laser beam, and $\beta$ refers to an angle between the optical axis and the CCD sensor.

Figure 6:
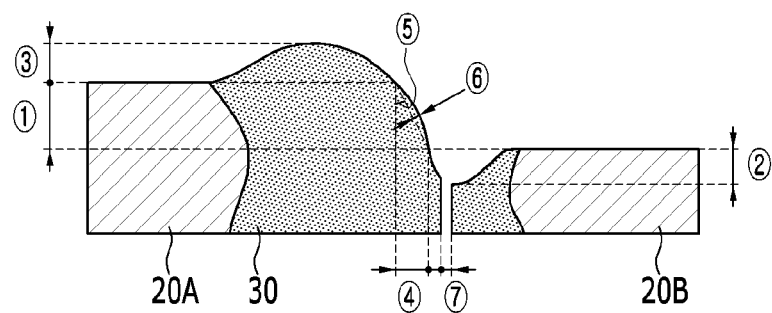
FIG. 6 is a drawing showing feature variables according to an exemplary embodiment of the present invention.

FIG. 6 is a drawing showing feature variables according to an exemplary embodiment of the present invention.

The image processor 1242 extracts various feature variables such as a width, a height, a depth, a curvature, and the like from the measured bead shape.

The feature variables used in an exemplary embodiment of the present invention are shown in FIG. 6.

In FIG. 6, ① refers to a height difference between the basic materials, ② refers to a bead valley depth, ③ refers to a bead hill height, ④ refers to a width between the valley and the hill of the bead, ⑤ refers to a bead valley angle, ⑥ refers to a bead valley curvature, and ⑦ refers to a key hole width.

Although FIG. 6 shows seven feature variables, various feature variables may be used according to the purpose of the user.

Figure 7:
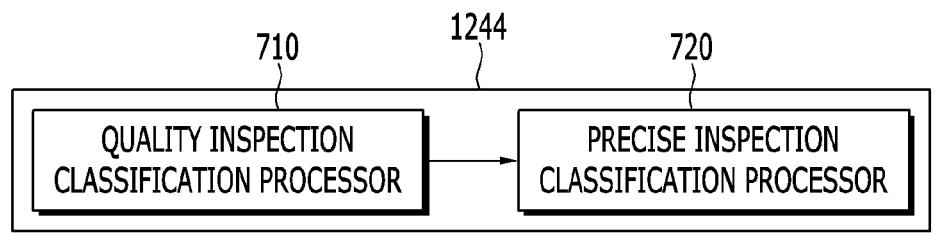
FIG. 7 is a drawing showing a classification processor according to an exemplary embodiment of the present invention.
Figure 8:
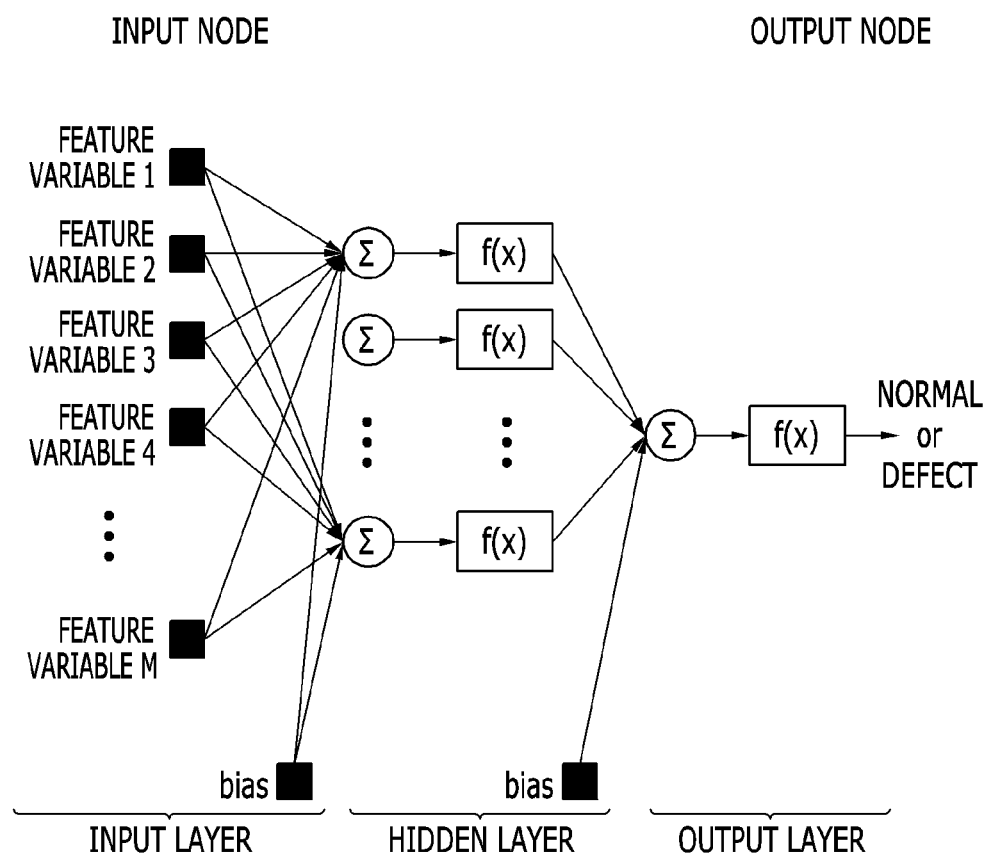
FIGS. 8 and 9 are drawings showing examples of a quality inspection classification processor and a precise inspection classification processor shown in FIG. 7.
Figure 9:
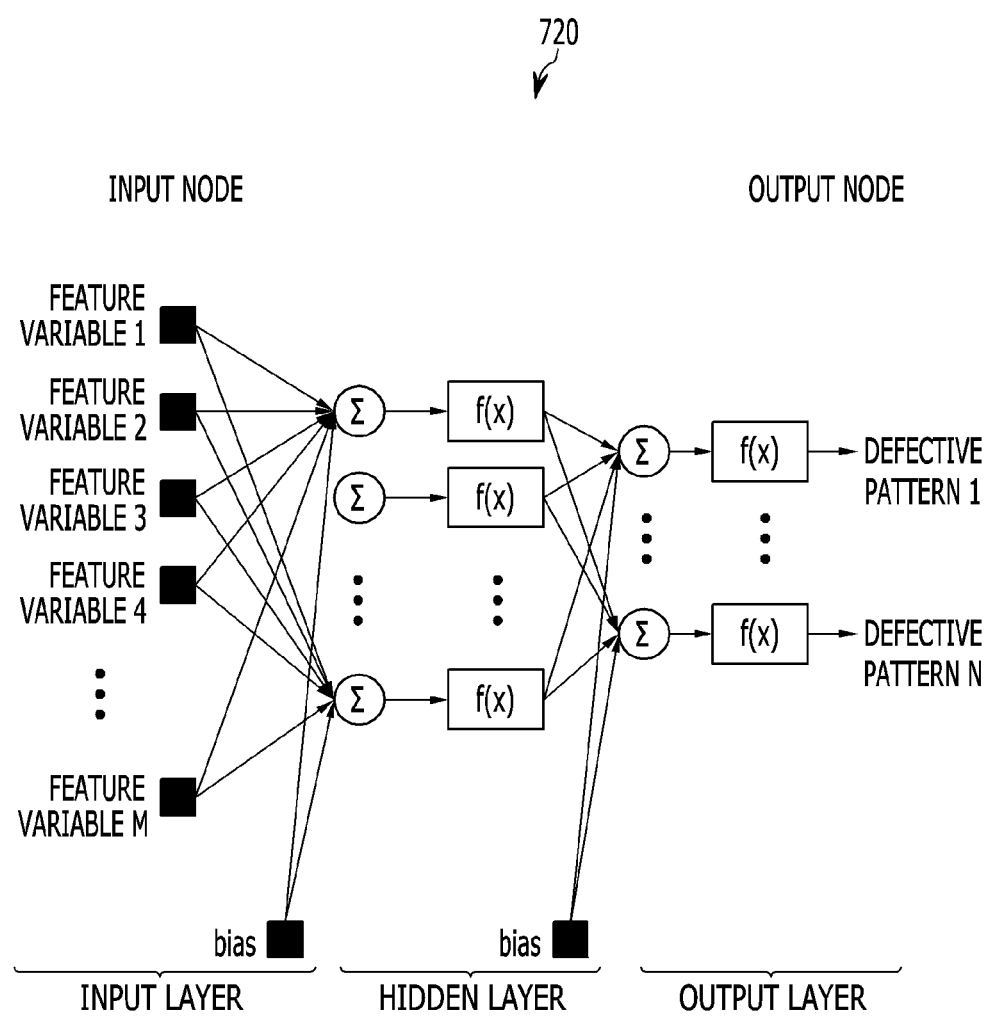

FIG. 7 is a drawing showing a classification processor according to an exemplary embodiment of the present invention, and FIGS. 8 and 9 are drawings showing examples of a quality inspection classification processor and a precise inspection classification processor shown in FIG. 7.

Referring to FIG. 7, the classification processor 1244 includes a quality inspection classification processor 710 performing primary quality inspection, and a precise inspection classification processor 720 performing secondary precise inspection.

Referring to FIGS. 8 and 9, the quality inspection classification processor 710 and the precise inspection classification processor 720 are operated based on a neural network.

More specifically, the quality inspection classification processor 710 and the precise inspection classification processor 720 use a multilayer error back-propagation neural network (BPNN) and an active function [f(x)] of each node of the neural network uses a bipolar sigmoid function, which is shown in Equation 3.

$$f(x) = \frac{2}{1 + \exp(-x)} - 1$$ [Equation 3]

The quality inspection classification processor 710 and the precise inspection classification processor 720 which are based on the neural network described above include an input layer receiving a plurality of feature nodes, an output layer outputting a classified result, and a hidden layer representing a relationship between an input and an output between the input layer and the output layer. The input layer may include a plurality of feature variables, for example, M feature variables (feature variable 1 to feature variable M) and a plurality of input nodes receiving a bias value (bias). The output layer may include at least one output node outputting the classified result.

Because the quality inspection classification processor 710 classifies the bead quality into two kinds of normal and defective, the number of input nodes of the input layer is equal to the number of feature variables plus 1, and the number of output nodes is 1.

Because the precise inspection classification processor 720 classifies the defective bead form into various preset defective bead forms, the number of input nodes is equal to the number of feature variables plus 1, and the number of output nodes is equal to the number of the preset defective bead forms. Kinds of defective bead forms may include reinforcement, undercut, sharp corner, incompletely filled groove, misalignment, and the like. In addition to those described above, various kinds of defective bead forms may be present.

The precise inspection classification processor 720 selects a defective form corresponding to a largest value among values of all output nodes as a final classification and displays the selected defective form.

Referring to FIG. 8, describing the neural-based classification of the quality inspection classification processor 710, each of the plurality of input nodes of the input layer receives the feature variables and the bias value. In this case, input channels of the plurality of input nodes have weight values, and each of a plurality of hidden nodes of the hidden layer outputs a value obtained by applying the active function [f(x)] to a value obtained by multiplying values input to the plurality of input nodes by a corresponding weight value and then summing the multiplied values. One output node of the output layer sums all values output from the plurality of hidden nodes, outputs a value obtained by applying the active function [f(x)] to the summed value, and determines normal or defective depending on the output value.

Referring to FIG. 9, each of the plurality of input nodes of the input layer receives the feature variables and the bias value. In this case, input channels of the plurality of input nodes have weight values, and each of a plurality of hidden nodes of the hidden layer outputs a value obtained by applying the active function [f(x)] to a value obtained by multiplying values input to the plurality of input nodes by a corresponding weight value and then summing the multiplied values. Each of the plurality of output nodes of the output layer sums the values output from the plurality of hidden nodes and the bias value, outputs a value obtained by applying the active function [f(x)] to the summed value, and classifies the bead defective forms (defective pattern 1 to defective pattern N) depending on the output value. In addition, the defective form corresponding to a largest value among values output from the plurality of output nodes may be selected as a final defective form.

Because the neural network based classification described above is a well known technology, a detailed description thereof will be omitted.

The quality inspection classification processor 710 and the precise inspection classification processor 720 may use various machines such as a radial basis function (RBF), a decision tree, a support vector machine (SVM), a purge network, and the like depending on the purpose of the user.

The neural network based classification has classification accuracy determined according to a neural network structure. That is, the classification accuracy may be increased by appropriately setting a learning rate, which is a variable used when updating the weight value through repetition learning and the number of hidden layer nodes. In this case, for the purpose of the classification accuracy, the learning rate and the number of hidden layer nodes may be set to an optimal value by the user.

According to an embodiment of the present invention, the apparatus and the method for monitoring the laser welding bead may improve the welding quality by using them together with the laser welding machine, and may decrease manufacturing cost and perform a total inspection due to early sensing of the defective welding.

The above-mentioned exemplary embodiments of the present invention are not embodied only by an apparatus and/or method. Alternatively, the above-mentioned exemplary embodiments may be embodied by a program performing functions which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for monitoring a welding bead generated by welding of a laser welding machine, the apparatus comprising:
   a vision sensor part irradiating a laser to a surface of the welding bead and collecting a signal reflected from the surface of the welding bead as an image signal; and
   a terminal part that extracts a plurality of feature variables from the collected image signal, determines welding defects using the plurality of feature variables, and classifies defective forms based on the determining the welding defects,
   wherein the terminal part includes:
      a quality inspection classifying unit determining whether or not the collected image signal includes a defect by performing quality inspection using a first neural network receiving as inputs the plurality of feature variables and a first bias input signal; and
      a precise inspection classifying unit classifying defective forms by performing precise inspection using a second neural network receiving as inputs the plurality of feature variables input to the first neural network and a second bias input signal,
   wherein the first neural network has a plurality of input nodes equal in number to the plurality of feature variables and receiving as inputs the plurality of feature variables and the first bias input signal,
   the first neural network has only one output node outputting a binary output indicating whether the collected image signal depicts a normal weld or a defective weld, the second neural network has a plurality of input nodes equal in number to the plurality of feature variables and receiving as inputs the plurality of feature variables and the second bias signal, the second neural network has a plurality of output nodes equal in number to a number of preset defective bead forms, the plurality of feature variables are provided to the second neural network based on the first neural network indicating detection of a defective weld, the plurality of feature variables includes at least one of a height difference between basic materials to be welded, a valley depth of the welding bead, a hill height of the welding bead, a width between the valley and the hill of the welding bead, a valley angle of the welding bead, a valley curvature of the welding bead, and a key hole width, and the vision sensor part includes a laser diode and a laser structure light lens that receives the light from the laser diode and uniformly irradiates the laser to the surface of the welding bead.

2. The apparatus of claim 1, wherein the terminal part is configured to control the laser welding machine to perform welding at a next position based on detecting no defects in the image signal.

3. The apparatus of claim 1, wherein the terminal part is configured to control the laser welding machine to stop welding based on detecting the defects in the image signal.

4. The apparatus of claim 1, wherein the vision sensor part includes:
   a laser scan camera including a charge-coupled device (CCD) sensor converting the signal reflected from the surface of the welding bead into the image signal; and
   a telecentric lens passing only a signal parallel to an optical axis among the signals reflected from the surface of the welding bead to the laser scan camera.

5. The apparatus of claim 1, wherein the vision sensor part further includes:
   a collimation lens removing diffuse components of the laser and providing linearity.

6. The apparatus of claim 5, wherein the laser structured light lens irradiates the laser in a uniformly-patterned line.

7. The apparatus of claim 1, wherein the first neural network and the second neural network include a multilayer error back-propagation neural network.

8. The apparatus of claim 1, wherein the terminal part is configured to display one or more defective forms based on an output from the second neural network, and to receive a user input to control the laser welding machine based on the display of the one or more defective forms.

9. A method for monitoring a welding bead generated by welding of a laser welding machine in an apparatus for monitoring a laser welding bead, the method comprising:
   irradiating a laser to a surface of the welding bead in a uniform pattern;
   collecting a signal, based on the uniform pattern, reflected from the surface of the welding bead as an image signal;
   measuring a bead shape from the image signal;
   extracting a plurality of feature variables from the bead shape;
   detecting welding defects by performing quality inspection using a first neural network receiving the plurality of feature variables;
   outputting a binary output signal indicating a normal weld or a defective weld based on the quality inspection;
   based on detecting the defective weld in the quality inspection, classifying the defective weld into one or more of a plurality of defective forms by performing precise inspection using a second neural network receiving the plurality of feature variables; and
   controlling the laser welding machine according to whether or not the welding defects are generated,
   wherein the first neural network has a plurality of input nodes equal in number to the plurality of feature variables and receiving as inputs the plurality of feature variables and a first bias input signal,
   the first neural network has only one output node outputting the binary output indicating whether the collected image signal depicts the normal weld or the defective weld,
   the second neural network has a plurality of input nodes equal in number to the plurality of feature variables and receiving as inputs the plurality of feature variables and a second bias signal,
   the second neural network has a plurality of output nodes equal in number to a number of preset defective bead forms, and
   the plurality of feature variables includes at least one of a height difference between basic materials to be welded, a valley depth of the welding bead, a hill height of the welding bead, a width between the valley and the hill of the welding bead, a valley angle of the welding bead, a valley curvature of the welding bead, and a key hole width.

10. The method of claim 9, wherein, when no defects are detected in the image signal, the controlling of the laser welding machine includes instructing the laser welding machine to perform welding at a next position.

11. The method of claim 9, wherein the controlling of the laser welding machine includes:
   displaying the defective forms; and
   instructing the laser welding machine to stop the welding according to a selection of a user.

12. The method of claim 9, wherein the irradiating of the laser includes removing diffuse components from the laser in a visible light region and uniformly irradiating the laser to the surface of the welding bead.

13. The method of claim 12, wherein uniformly irradiating the laser to the surface of the welding bead includes irradiating the laser in a uniformly-patterned line.

* * * * *